United States Patent [19]
Tyner

[11] Patent Number: 5,953,192
[45] Date of Patent: Sep. 14, 1999

[54] SOLID STATE CONTROL DEVICE FOR AN ANTI-PUMP CIRCUIT

[75] Inventor: Richard E. Tyner, Florence, S.C.

[73] Assignee: ABB Power T&D Company Inc., Raleigh, N.C.

[21] Appl. No.: 08/808,318

[22] Filed: Feb. 28, 1997

[51] Int. Cl.[6] .................................................. H02H 1/00
[52] U.S. Cl. ........................................ 361/114; 361/115
[58] Field of Search ................................. 361/71–75, 93, 361/100–102, 114–116, 187, 152, 160, 170; 307/132 E, 142

[56] References Cited

U.S. PATENT DOCUMENTS

| | | | |
|---|---|---|---|
| 3,530,339 | 9/1970 | Beck | 361/114 |
| 3,783,367 | 1/1974 | Yamamoto et al. | 321/11 |
| 3,818,276 | 6/1974 | Jacobs | 361/114 |
| 4,185,208 | 1/1980 | McMillen, Jr. et al. | 307/140 |
| 4,234,917 | 11/1980 | Suzuki et al. | 363/160 |
| 4,390,831 | 6/1983 | Byrd et al. | 323/240 |
| 4,423,477 | 12/1983 | Gurr | 363/54 |
| 5,510,943 | 4/1996 | Fukunaga | 361/18 |
| 5,734,543 | 3/1998 | Turner | 361/154 |

OTHER PUBLICATIONS

"American National Standard Requirements for Electrical Control for AC High–Voltage Circuit Breakers Rated on a Symmetrical Current Basis or a Total Current Basis," ANSI/IEEE, C37.11–1979, p. 5; C37–09–1979, p. 51.

Primary Examiner—Michael J. Sherry
Attorney, Agent, or Firm—Woodcock Wasburn Kurtz Mackiewicz & Norris LLP

[57] ABSTRACT

A solid state control system for controlling activation signals to circuit breaker electro-mechanical close coils is disclosed. The system employs a novel arrangement of a silicon controlled rectifier (SCR) and other electronic components, such as a FET, to provide "anti-pump." The system locks out continuous close signals until after the close signal has been removed and then reapplied.

5 Claims, 3 Drawing Sheets

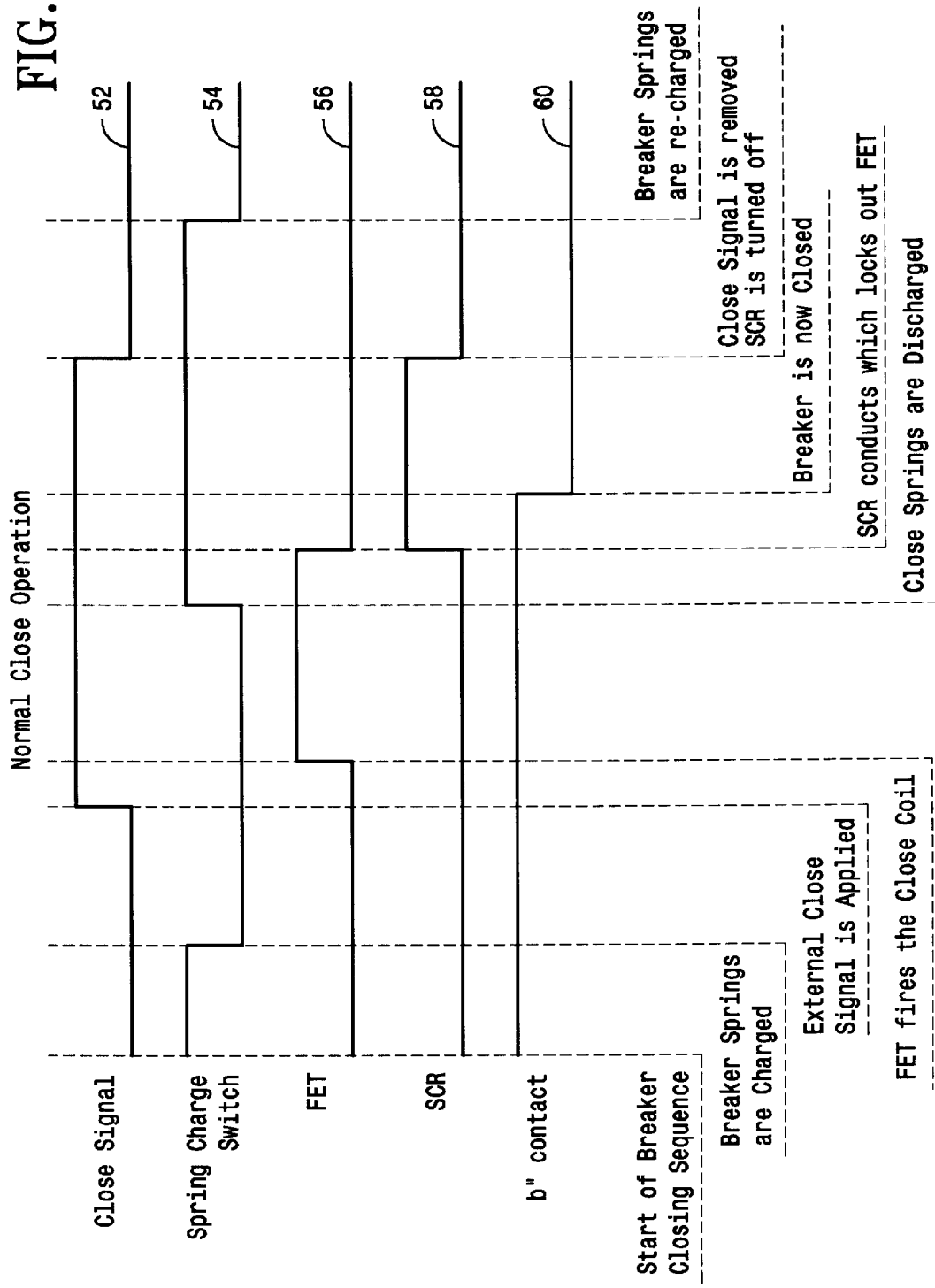

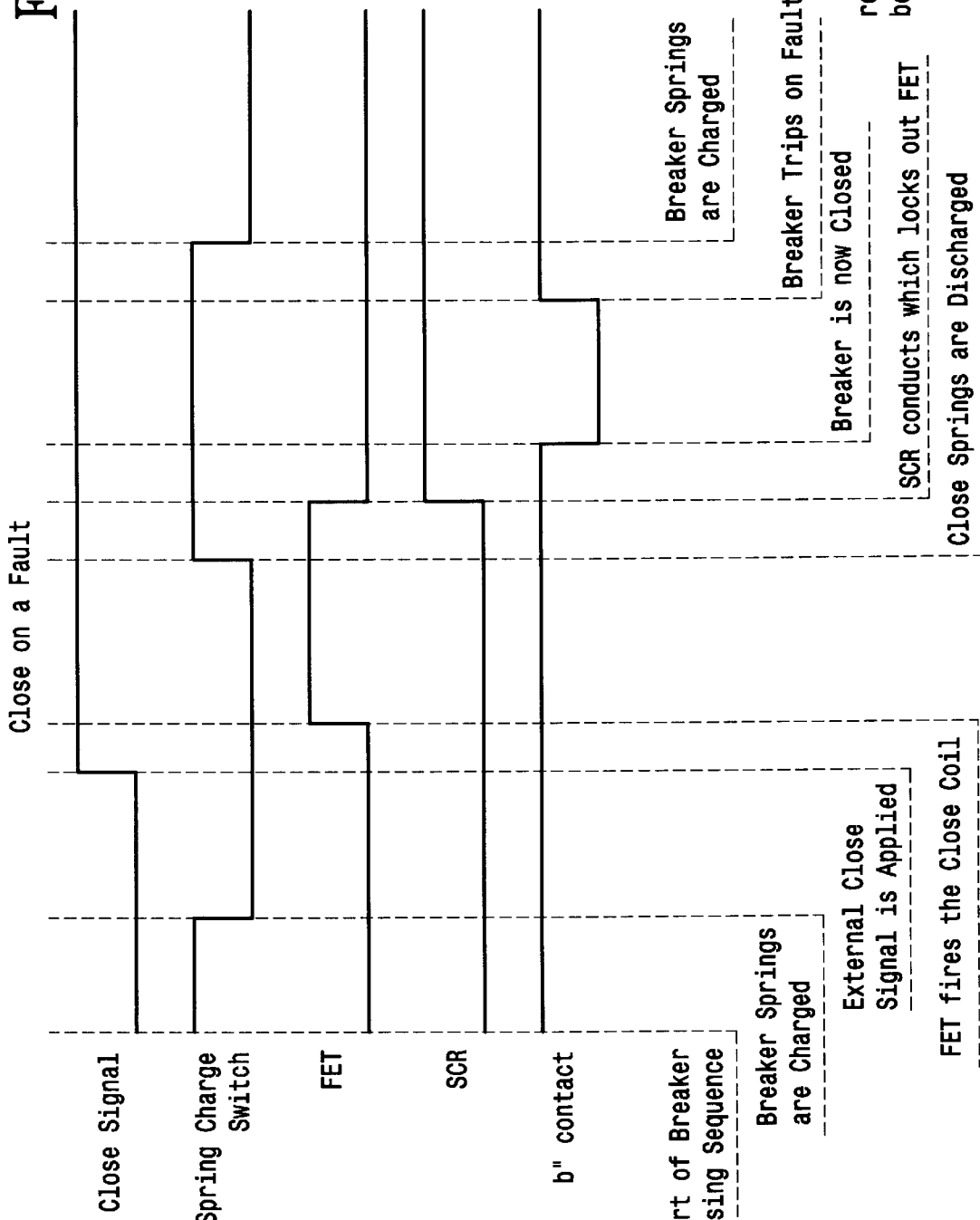

SOLID STATE CONTROL DEVICE FOR AN ANTI-PUMP CIRCUIT

FIELD OF THE INVENTION

The present invention relates generally to high power electrical circuit breakers. More particularly, the invention relates to a solid state control device for controlling open and close signals to a high power electrical circuit breaker.

BACKGROUND OF THE INVENTION

High power circuit breaker applications typically employ electro-mechanical solenoids to physically open and close a circuit breaker. The electro-mechanical solenoid that opens the breaker is referred to as the "open" coil. The solenoid that physically closes the circuit breaker is referred to as the "close" coil. In prior art circuit breaker applications, a third coil, commonly referred to as the "Y" coil is employed to inhibit an additional close signal to the close coil. A "Y" coil combined with its supporting circuitry is commonly referred to as an "anti-pump" circuit.

American National Standards Institute (ANSI) standards C37.09-1979 and C37.11-1979 specify that a circuit breaker should close only once in response to any one close signal. A circuit breaker which meets this specification is said to have anti-pump. Under these ANSI standards, if a close signal is applied to a circuit breaker and subsequently maintained or held, the circuit breaker shall not close again until the close signal is first removed and a new close signal applied. This rule holds even if the circuit breaker opens while the initial close signal is being held. In such a case, the close signal must be removed before the breaker is permitted to re-close.

Prior art circuit breaker applications attempted to satisfy the ANSI standards by designing the electro-mechanical "Y" coil to "lock out" redundant close signals that are received prior to the release of a previous close signal. However, electro-mechanical coils, including those employed as "Y" coils are subject to bounce and chatter. Bounce in the "Y" coil is particularly troublesome with respect to the anti-pump standards in that it can cause an activation signal to be inadvertently transmitted to the close coil. For example, due to the bounce inherent in all electro-mechanical coils, which is amplified by the closing-force shock of the breaker itself, a "Y" coil may transmit an activation signal to the close coil when the close coil should be electrically locked out. Such an inaccuracy in the operation of the "Y" coil violates the ANSI anti-pump standards. Furthermore, this deficiency in the electro-mechanical "Y" coil can cause the breaker to re-close during interruption, which can lead to circuit breaker failure.

Therefore, there is a need for a circuit breaker control system that provides accurate and reliable anti-pump control.

SUMMARY OF THE INVENTION

The present invention, fulfills this need by supplying a solid state control device for controlling close and open signals to a circuit breaker. The solid state control device operates to inhibit the circuit breaker from closing more than once in response to any one close signal without the use of a "Y" coil.

The solid state control device includes an electronic switch, such as a field effect transistor, connected in series with the close coil. The electronic switch is controlled by a gate such that the close coil is energized when a signal is applied to the electronic switch gate. Additionally, a silicon control rectifier (SCR) also having a gate is electrically coupled to the gate of the electronic switch such that a signal is supplied to the gate of the electronic switch whenever the SCR is not conducting. A close spring sensor switch is connected to the gate of the SCR such that the SCR conducts when the close spring sensor switch is closed. Other features of the present invention are described below.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 2 s a timing diagram of the anti-pump circuit of the present invention during a normal close operation; and, FIG. 3 is a timing diagram of the anti-pump circuit of the present invention during lockout.

DETAILED DESCRIPTION OF THE INVENTION

The present invention provides a system for providing anti-pump capabilities to a circuit breaker close circuit. In the preferred embodiment of the invention a field effect transistor (FET) and a silicon controlled rectifier (SCR) are employed. However, other components could be substituted for these components to provide a similar function. For example, a transistor switch could be employed in place of the FET and a thyristor could be used in place of the SCR. Moreover, although the invention is described throughout the description in reference to an electro-mechanical close coil, as the state of the art advances the invention could be used with other circuit breaker close mechanisms.

The present invention overcomes the problems associated with the inaccurate and unreliable electro-mechanical "Y" coil by eliminating the "Y" coil and placing the functionality for locking out close signals in a solid state control device (SSCD). As is explained in further detail below, the anti-pump function is provided by a Silcon Controlled Rectifier (SCR), a field effect transistor (FET) and supporting circuitry. When a close signal is applied to the gate of the SCR the SCR turns on. Consequently, the FET is turned off as the SCR conducts removing current from the FET gate. As is generally the case with SCR's, after the SCR turns on the gate loses the ability to control the SCR until voltage is removed from across the anode and cathode. In this way, the SCR latches the close signal of the SSCD. As distinguished from the prior art electro-mechanical "Y" coils, SCR Q1 reliably and accurately "locks out" additional close signals to prevent the circuit breaker from closing more than once in response to any one close signal.

Figure 1:
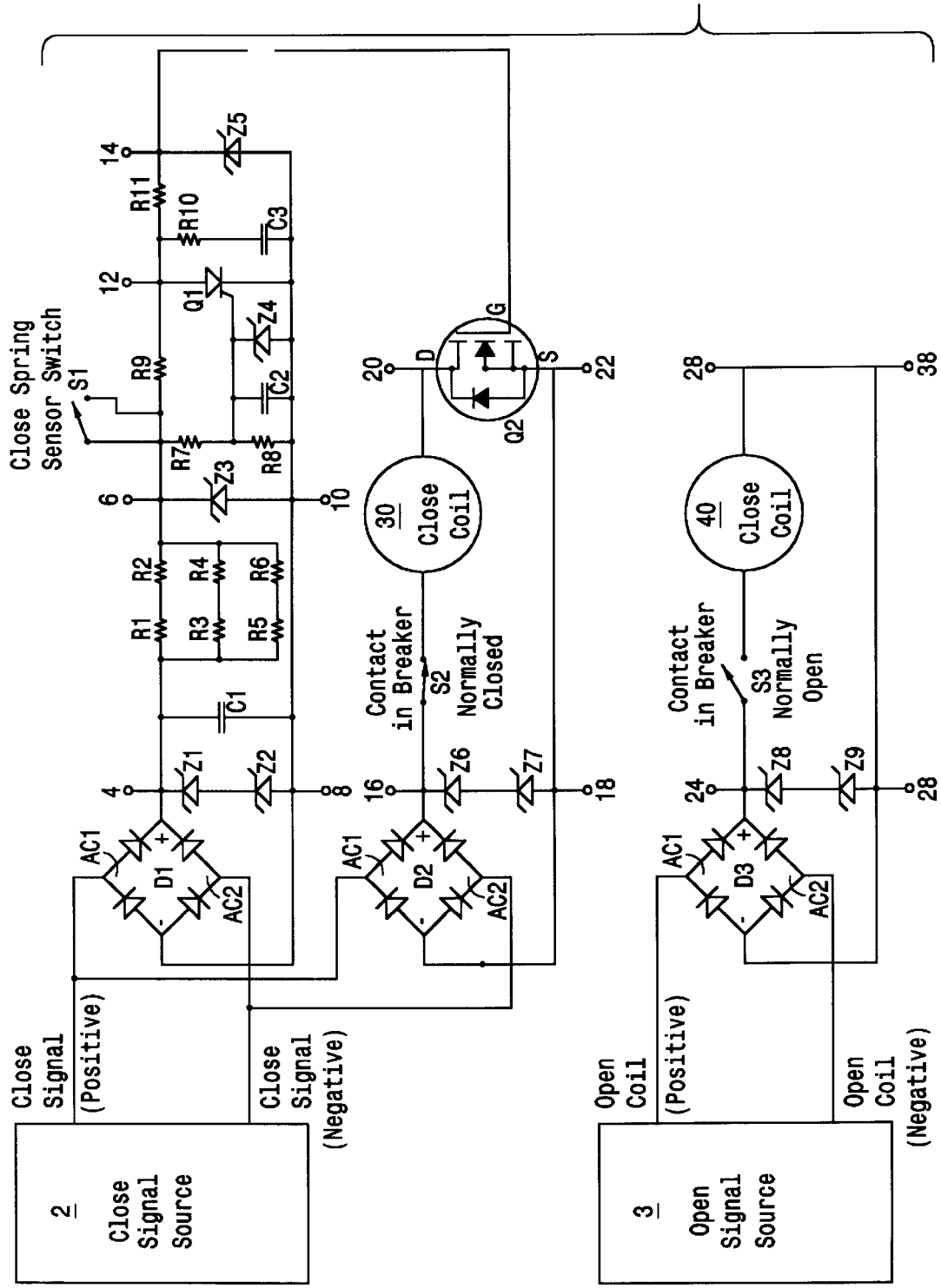
Fig. 1 is a schematic and block diagram showing a circuit arrangement for a system in accordance with the present invention.
Figure 1:
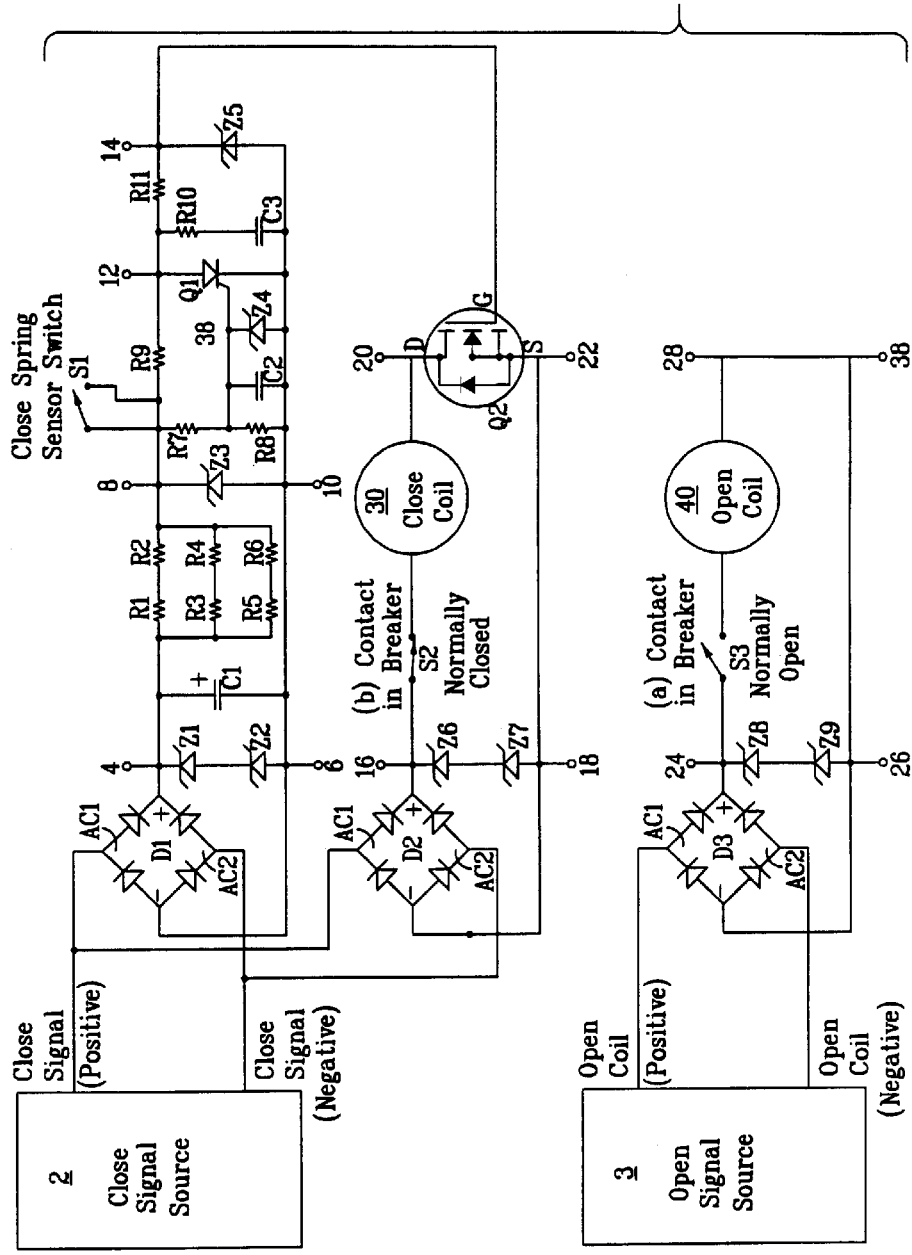

FIG. 1 is a schematic and block diagram of the inventive SSCD. As shown in FIG. 1, upon receiving a close signal, in either AC or DC form, from an external signal source 2 such as the power company, the SSCD rectifies and filters the close signal using a diode bridge D1 and shunt-filter capacitor C1. Two transient voltage suppressors Z1, Z2 are placed in series across the positive 4 and negative terminals 6 so as to clamp transient voltage spikes. A series/parallel combination of resistors R1, R2, R3, R4, R5, R6 connected between points 4 and 8 reduces the current of the rectified and filtered close signal. A zener diode Z3 coupled across points 8 and 10 regulates the close signal to approximately 20 V DC. A resistor R9 connected between points 8 and 12 limits current supplied to SCR Q1 and zener Z5. Resistor R11 prevents the short circuiting of zener Z5 when SCR Q1 is turned on. Zener Z5 regulates the close voltage to approximately 15 VDC at point 14. Upon receiving a close signal at point 14, FET Q2 receives a signal at its gate terminal sufficient to activate and allow current flow through the device from point 20 to point 22. A capacitor C3 along with resistor R10 comprise a snubber circuit for SCR Q1.

Activating FET Q2 closes the electrical path between points 20 and 22. As a result, a circuit is complete and current can flow. Specifically, the current flows through the bridge rectifier D2, out of the SSCD to the circuit breaker normally closed contact (b), through close coil 30, back into the SSCD, and through the FET Q2.

When the circuit breaker physically closes in response to the close coil, the contact (b) disconnects and breaks current from the circuit.

As noted above, ANSI standards require that a circuit breaker close only once in response to any one close signal. Therefore, if the close signal is maintained and the breaker opens, the breaker will not close again until the close signal is first removed and a new close signal applied. Moreover, the close coil also may not activate while the breaker is in the closed position.

As shown, SCR Q1 is arranged in parallel to resistor R11 and zener Z5. When SCR Q1 is biased so as to conduct, electrical current, which otherwise would flow through R11 to the gate of FET Q2, flows through SCR Q1. This reduces the voltage at the gate of FET Q2 to about 0.7 VDC and subsequently turns off FET Q2.

For a high power circuit breaker to function, its contacts must be held together with a specified minimum force. Here, necessary force is supplied by close springs. These springs must be compressed (i.e., "charged") by a motor or a manual charge handle, for example. Furthermore, a charge motor switch is used to turn off the charge motor once the springs are charged.

A close spring sensor switch S1 is connected to two SSCD inputs. When the circuit breaker closes, the close springs discharge which closes switch S1. After the close spring sensor switch Si has closed, SCR Q1 is activated via current flowing through a resistor R7 to the activation gate 38. As a consequence of the parallel arrangement between SCR Q1 and R11 and Z5, once SCR Q1 has been activated, little or no current reaches the gate of FET Q2. A resistor R8, zener Z4 and capacitor C2 are connected parallel to each other and in series with the first resistor R7 so as to provide sufficient impedance to keep SCR Q1 deactivated until close spring sensor switch S1 closes. Zener Z4 is used to clamp the gate voltage of SCR Q1 to less than about 3.5 VDC. A resistor R10 and capacitor C3 form a snubber circuit to protect SCR Q1 from an overcurrent condition.

Thus, SCR Q1 and the surrounding circuitry insure that after the circuit breaker closes, the circuit breaker will not close again until the initial close signal is first removed. SCR Q1 will continue to conduct, locking out additional close current from reaching the FET Q2 for as long as the close signal is present.

SCR Q1 is reset when the close signal is removed.

Removing the close signal takes the SCR current to zero and deactivates the SCR Q1. With the SCR Q1 deactivated, a new close signal can reach the gate of FET Q2 and restart the above described sequence.

The SSCD also provides for control of signals to the circuit breaker open coil 40. As shown, open coil signals pass through a rectifier D3 and are provided to the circuit breaker open coil 40. Two Transient Voltage Suppressors Z8, Z9 connected in series across the rectifier D3, between points 24 and 26 protect against voltage spikes.

FIGS. 2 and 3 provide timing diagrams of the SSCD for a normal close operation (FIG. 2) and a faulty close operation (FIG. 3). Curve 52 shows the close signal provided to the SSCD. Curve 54 provides the state of spring charge switch SI. Curve 56 shows the state of FET Q2. Curve 58 shows the state of SCR Q1. And curve 60 shows the state of the "b" contact. As shown in FIG. 2, at the start of the breaker closing sequence, spring charge switch S1 is in the close position, SCR Q1 is not conducting and the "b" contact is closed. Moreover, FET Q2 is turned off and no close signal is present. After the breaker springs are fully charged, spring charge switch Si opens. An external close signal will then reach the gate of FET Q2. Shortly thereafter, the FET Q2 fires close coil 30. When the coil fires, the close springs are discharged closing charge switch S1. This creates a voltage at the gate of SCR Q1 causing SCR Q1 to conduct. As SCR Q1 conducts the voltage is removed from the gate of FET Q2. Accordingly, FET Q2 is locked out (i.e. the circuit between point 20 and 22 is opened until voltage is applied to the gate of FET Q2). The breaker is then closed causing the "b" contact to open. Thereafter, when the close signal is removed, The SCR is turned off.

FIG. 3 presents the timing diagram wherein the breaker trips on a fault condition before the close signal is removed. The first seven timing steps are the same as in FIG. 2. However, in this diagram, the breaker subsequently trips on a fault before the closed signal is removed. The breaker cannot re-close because SCR Q1 is still conducting and locking out FET Q2.

The present invention may be employed in other specific forms without departing from the spirit or essential attributes thereof. For example, any number of combinations of series and parallel connected resistors could be used in place of the present combination of resistors R1, R2, R3, R4, R5 and R6. Furthermore, various combinations of resistors and capacitors could be used to control the flow of current to the SCR gate. While the invention has been described and illustrated with reference to specific embodiments, those skilled in the art will recognize that modification and variations may be made without departing from the principles of the invention as described hereinabove and set forth in the following claims. Furthermore, any zener diode voltage may be used with the resistor networks to control the SCR gate.

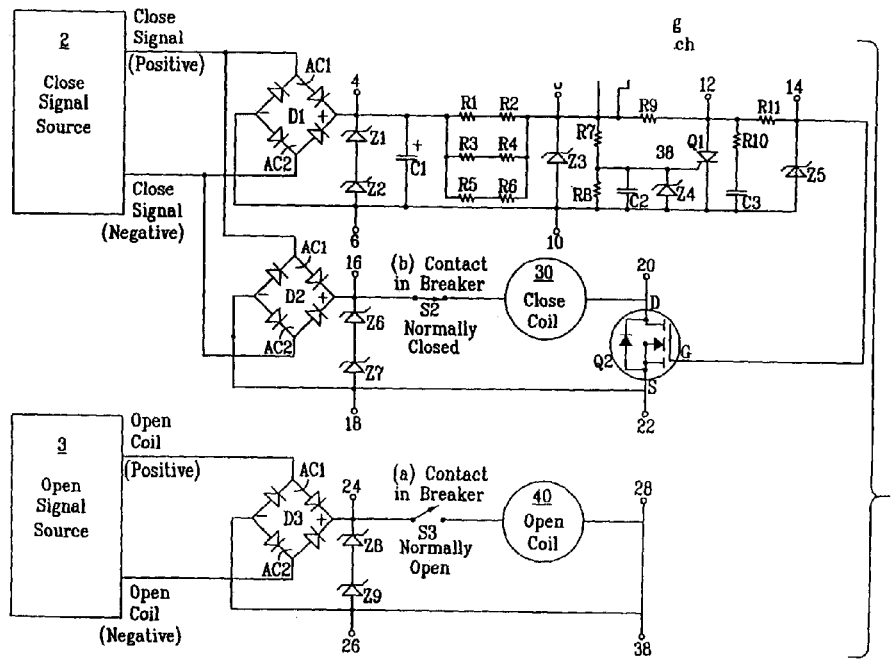

I claim:

1. A solid state control device for a circuit breaker, said circuit breaker having a close coil which closes said circuit breaker when energized, the control device comprising:

circuit means operatively coupled to the close coil for inhibiting the circuit breaker from closing more than once in response to any one close signal without the use of a "Y" coil, said circuit means comprising:

an electronic switch connected in series with the close coil, said electronic switch being controlled by a gate such that the close coil is energized when a signal is applied to the gate of said electronic switch;

a silicon control rectifier having a gate, said silicon control rectifier being electrically coupled to the gate of said electronic switch such that a signal is supplied to the gate of the electronic switch whenever said silicon control rectifier is not conducting; and a close spring sensor switch connected to the gate of said silicon control rectifier such that said silicon control rectifier conducts when said close spring sensor switch is closed.

2. The solid state control device as recited in claim 1 wherein said electronic switch is a field effect transistor.

3. A solid state control system, comprising:

a close coil circuit including a close coil and an electronic switch coupled together in a series configuration, said electronic switch having a gate, said close coil circuit being closed when an electrical signal is applied to the gate of the electronic switch and said close coil circuit being open when said electrical signal is removed from the gate of the electronic switch;

a silicon controlled rectifier coupled to the gate of the electronic switch such that the electrical signal is removed from the gate of the electronic switch when the silicon control rectifier is activated; and a sensor switch coupled to a gate of the silicon control rectifier such that the silicon control rectifier is capable of activation when said sensor switch is closed.

4. The solid state control system as recited in claim 3 wherein said electronic switch comprises a field effect transistor.

5. The solid state control system as recited in claim 3 wherein said sensor switch comprises a close spring sensor switch.

* * * * *

UNITED STATES PATENT AND TRADEMARK OFFICE
CERTIFICATE OF CORRECTION

PATENT NO. : 5,953,192
DATED : September 14, 1999
INVENTOR(S) : Richard E. Tyner It is certified that error appears in the above-identified patent and that said Letters Patent is hereby corrected as shown below:

Title page,
Showing an illustrative figure, should be deleted and substitute therefor the attached title page.

Drawings,
Delete Figure 1, and substitute therefor Figure 1, as shown on the attached pages.

Signed and Sealed this

Second Day of July, 2002

Attest:

JAMES E. ROGAN
Attesting Officer    Director of the United States Patent and Trademark Office

United States Patent [19]
Tyner

[11] Patent Number: 5,953,192
[45] Date of Patent: Sep. 14, 1999

[54] SOLID STATE CONTROL DEVICE FOR AN ANTI-PUMP CIRCUIT

[75] Inventor: Richard E. Tyner, Florence, S.C.

[73] Assignee: ABB Power T&D Company Inc., Raleigh, N.C.

[21] Appl. No.: 08/808,318

[22] Filed: Feb. 28, 1997

[51] Int. Cl.$^6$ .................................................. H02H 1/00
[52] U.S. Cl. ...................................... 361/114; 361/115
[58] Field of Search ........................... 361/71–75, 93, 361/100–102, 114–116, 187, 152, 160, 170; 307/132 E, 142

[56] References Cited

U.S. PATENT DOCUMENTS

| | | | |
|---|---|---|---|
| 3,530,339 | 9/1970 | Beck | 361/114 |
| 3,783,367 | 1/1974 | Yamamoto et al. | 321/11 |
| 3,818,276 | 6/1974 | Jacobs | 361/114 |
| 4,185,208 | 1/1980 | McMillen, Jr. et al. | 307/140 |
| 4,234,917 | 11/1980 | Suzuki et al. | 363/160 |
| 4,390,831 | 6/1983 | Byrd et al. | 323/240 |
| 4,423,477 | 12/1983 | Gurr | 363/54 |
| 5,510,943 | 4/1996 | Fukunaga | 361/18 |
| 5,734,543 | 3/1998 | Turner | 361/154 |

OTHER PUBLICATIONS

"American National Standard Requirements for Electrical Control for AC High–Voltage Circuit Breakers Rated on a Symmetrical Current Basis or a Total Current Basis," ANSI/IEEE, C37.11–1979, p. 5; C37–09–1979, p. 51.

Primary Examiner—Michael J. Sherry
Attorney, Agent, or Firm—Woodcock Washburn Kurtz Mackiewicz & Norris LLP

[57] ABSTRACT

A solid state control system for controlling activation signals to circuit breaker electro-mechanical close coils is disclosed. The system employs a novel arrangement of a silicon controlled rectifier (SCR) and other electronic components, such as a FET, to provide "anti-pump." The system locks out continuous close signals until after the close signal has been removed and then reapplied.

5 Claims, 3 Drawing Sheets